United States Patent
Brown (10) Patent No.: US 9,811,358 B2
(45) Date of Patent: Nov. 7, 2017

(54) SECURING PEER ZONING (71) Applicant: Infinidat LTD., Herzliya (IL)

(72) Inventor: Eran Brown, Givatayim (IL)

(73) Assignee: INFINIDAT LTD., Herzliya (IL)

( * ) Notice: Subject to any disclaimer, the term of this patent is extended or adjusted under 35 U.S.C. 154(b) by 297 days.

(21) Appl. No.: 14/634,839

(22) Filed: Mar. 1, 2015

(65) Prior Publication Data

US 2016/0253186 A1    Sep. 1, 2016

(51) Int. Cl.
- G06F 9/445 (2006.01)
- G06F 13/40 (2006.01)
- G06F 21/62 (2013.01)
- H04L 29/08 (2006.01)

(52) U.S. Cl.
CPC ...... G06F 9/44505 (2013.01); G06F 13/4022 (2013.01); G06F 21/6218 (2013.01); H04L 67/1097 (2013.01)

(58) Field of Classification Search
CPC .............. G06F 13/4022; H04L 67/1097
See application file for complete search history.

(56) References Cited

U.S. PATENT DOCUMENTS

| | | | | |
|---|---|---|---|---|
| 7,194,538 B1* | 3/2007 | Rabe | ............ | G06F 3/0605 709/220 |
| 7,805,525 B2* | 9/2010 | Grover | ............ | H04L 29/12009 709/224 |
| 2014/0351545 A1* | 11/2014 | Nakajima | ............ | G06F 3/0607 711/170 |

* cited by examiner

Primary Examiner — Farley Abad
(74) Attorney, Agent, or Firm — Reches Patents (57) ABSTRACT

A method that may include receiving, by a storage system, storage system configuration information that is indicative of access permissions of multiple host computer ports to storage logical units that are associated with a certain set of storage system ports; sending, by the storage system, in response to the storage system configuration information and to at least a first switch of a group of switches that is coupled to the storage system, access permission requests for allowing the multiple host computer ports to access the certain set of storage system ports; determining, by the storage system, to revoke an access permission from a certain host computer port of the multiple host computer hosts, when the certain host computer port failed to follow a predefined login pattern; and sending, by the storage system and to at least a second switch of the group of switches, a request to revoke the access permission of the certain host computer port.

13 Claims, 5 Drawing Sheets

SECURING PEER ZONING

BACKGROUND

Connecting hosts to storage over a network is a basic function of a SAN (Storage Area Network) that requires configuration of several entities: the hosts, the storage system and the Fibre-Channel switches that facilitate communication between hosts and the storage system.

To restrict host access to storage arrays, the Fibre channel switches are configured with zoning. Zoning is a configuration, performed by a system administrator (human) in the switch, for allowing certain hosts or host ports to forward traffic to certain destination ports in the storage system. In addition, an equivalent configuration, known as LUN mapping (also called LUN masking), is also required to be defined in the storage system, so as to ensure that the authorized host has access only to a predefined set of LUNs presented by the certain destination ports.

Since the LUN mapping information configured in the storage system has all the information required to create a zone in the switch, a new standard called Target Driven Zone (TDZ) was defined to allow the storage system to perform the zoning tasks (called Peer Zones) in the switches. Thus, once the storage system is configured with the LUN mapping, where a host port is associated with one or more storage (target) ports, the storage system can communicate with the SAN fabric for creating a zone automatically, for associating the storage port (known in TDZ as "principal N_Port") and the host port(s) (known in TDZ as "peers") that should be allowed to access the storage port. TDZ commands includes: add a peer zone, replace a peer zone and remove a peer zone.

SUMMARY

According to an embodiment of the invention various methods may be provided and are described in the specification.

According to various embodiments of the invention there may be provided a non-transitory computer readable medium that may store instructions for performing any of the methods described in the specification and steps thereof, including any combinations of same.

Additional embodiments of the invention include a storage system that is arranged to execute any or all of the methods described in the specification above, including any stages-and any combinations of same.

According to an embodiment of the invention there may be provided a method, the method may include receiving, by a storage system, storage system configuration information that is indicative of access permissions of multiple host computer ports to storage logical units that are associated with a certain set of storage system ports; sending, by the storage system, in response to the storage system configuration information and to at least a first switch of a group of switches that is coupled to the storage system, access permission requests for allowing the multiple host computer ports to access the certain set of storage system ports; determining, by the storage system, to revoke an access permission from a certain host computer port of the multiple host computer hosts, when the certain host computer port failed to follow a predefined login pattern; and sending, by the storage system and to at least a second switch of the group of switches, a request to revoke the access permission of the certain host computer port.

The determining may be responsive to login information indicative of a login status of the certain host computer port; wherein the login information may be generated by one or more switches of the group of switches.

The at least first switch forms a first sub-group of switches, wherein the at least second switch forms a second sub-group of switches. The first sub-group of switches may include the second sub-group of switches.

The first switch may differ from the second switch.

The first switch may be the second switch.

The at least first switch may include the group of switches.

The certain host computer port failed to follow the predefined login pattern when the certain host computer port was not logged to a certain switch during a certain period.

The certain switch may be the second switch.

The group of switches may belong to one or more switched fabrics. A certain host computer port failed to follow the predefined login pattern when the certain host computer port was not logged to a certain switching fabric during a certain period.

The certain switching fabric may include the at least second switch.

The access permission requests may be add-zone messages.

The request to revoke the access permission may be a remove-zone message.

A non-transitory computer readable medium that stores instructions that once executed by a storage system causes the storage system to execute the stages of: receiving storage system configuration information that is indicative of access permissions of multiple host computer ports to storage logical units that are associated with a certain set of storage system ports; sending in response to the storage system configuration information and to at least a first switch of a group of switches that is coupled to the storage system and, access permission requests for allowing the multiple host computer ports to access the certain set of storage system ports; determining to revoke an access permission from a certain host computer port of the multiple host computer hosts, when the certain host computer port failed to follow a predefined login pattern; and sending to at least a second switch of the group of switches, a request to revoke the access permission of the certain host computer port.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The terms LUN and volume are used herein in an interchangeable manner.

The terms SAN and fabric are used herein in an interchangeable manner and includes one or more interconnected switches.

The following embodiment facilitates automatic zone configuration while maintaining a certain level of security, especially when more than one fabric couples the hosts to the storage system.

After the LUN mapping is defined in the storage system, so that the host ports allowed to access volumes become known to the storage system, the storage system requests all the switches that connect the hosts to the storage system to add zones for correlating the configured host ports with destination ports. The requests to add zones include all combinations of configured host ports and storage ports.

Note that the configuration of the LUN mapping can be performed independently from the host setup operations and can be performed even before setting up the hosts and connecting them to the SAN(s). Furthermore, the storage system may not be aware of which host port is (or planned to be) connected to which fabric. Even if the storage is familiar with the planned network connections or is able to determine the current connections, such connections can be changed during the process of setting up the SAN or later on. Therefore, each zone configuration should be broadcast to all switches of all fabrics (or sent individually to all switches), so that the hosts, once set up, will be able to communicate with the storage system without barriers imposed by wrong or insufficient zone configuration.

Eventually, because each zone definition was replicated to all switches, not all the zones will become active in all the fabrics, i.e., not all zones will be used for passing traffic. This impose a security problem, since the host port, which is identified by a WWPN—World Wide Port Number, is burnt in the HBA card (host bus adapter) of the host and can be removed and replaced in another host that was not planned to have access to the same LUNs as the original host. So, the broadcast of the zone to all switches can leave behind a zone which may be used eventually by an unauthorized host. The embodiments of the present invention avoid such unauthorized use of forgotten zones.

Figure 1:
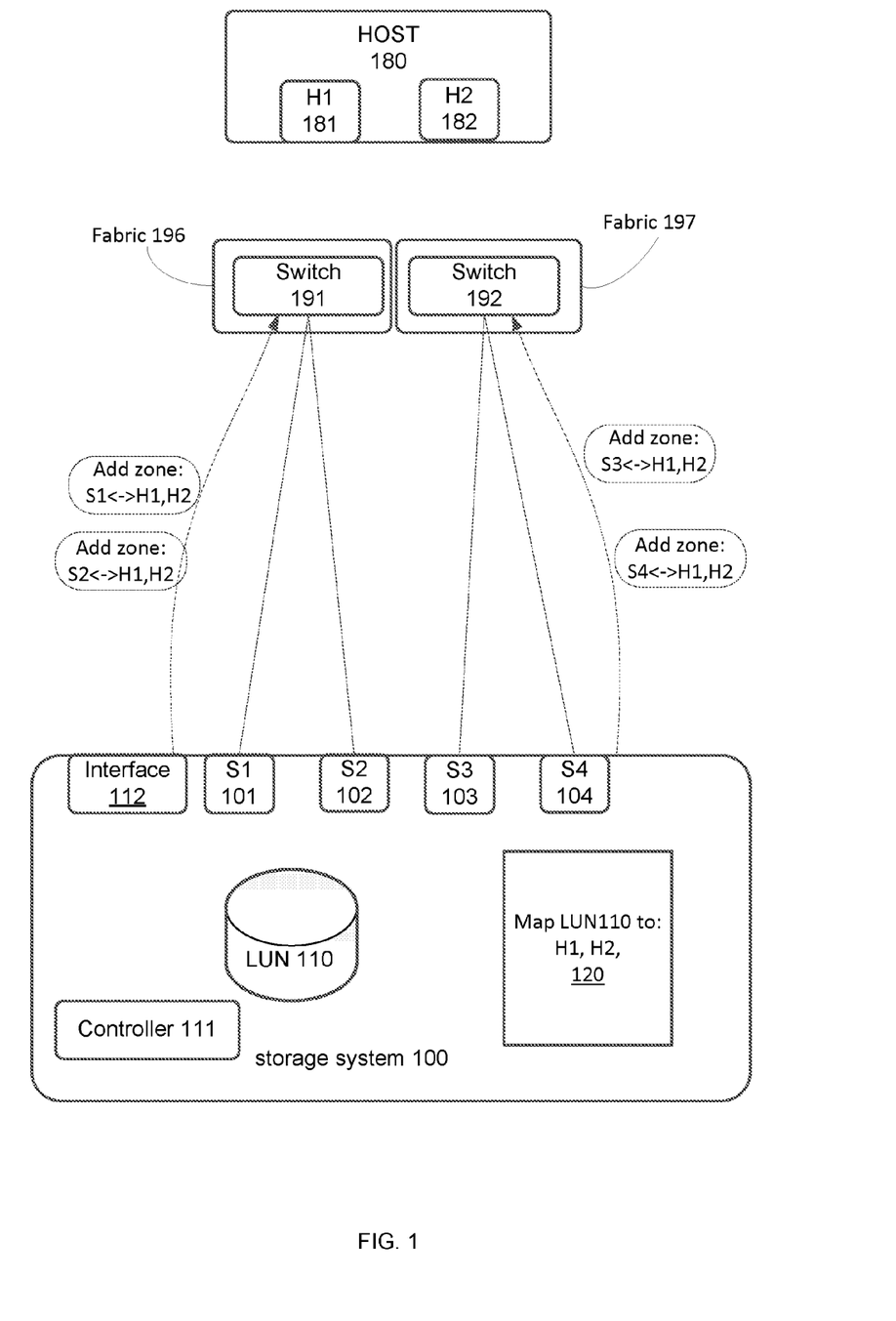
FIG. 1 illustrates a storage system, a host computer and two switching fabrics according to an embodiment of the invention.

FIG. 1 illustrates a storage system 100 with a controller 111 and four storage ports S1-S4 101-104. FIG. 1 also illustrates an interface 112 for interfacing between the storage system 100 and switching fabrics 196 and 197. The interface 112 may include storage ports S1-S4 101-104.

Controller 111 may include one or more hardware processors, one or more servers, one or more computers and the like. Ports S1 101 and S2 102 are coupled to a switch 191 of a switching fabric 196 and ports S3 103 and S4 104 are coupled to a switch 192 of switching fabric 197.

Both switches 191 and 192 facilitate communication in the two SAN networks between hosts and the storage system. For the sake of simplicity, each fabric is illustrated as including one switch, but it is noted that generally each fabric includes at least two switches.

Figure 3:
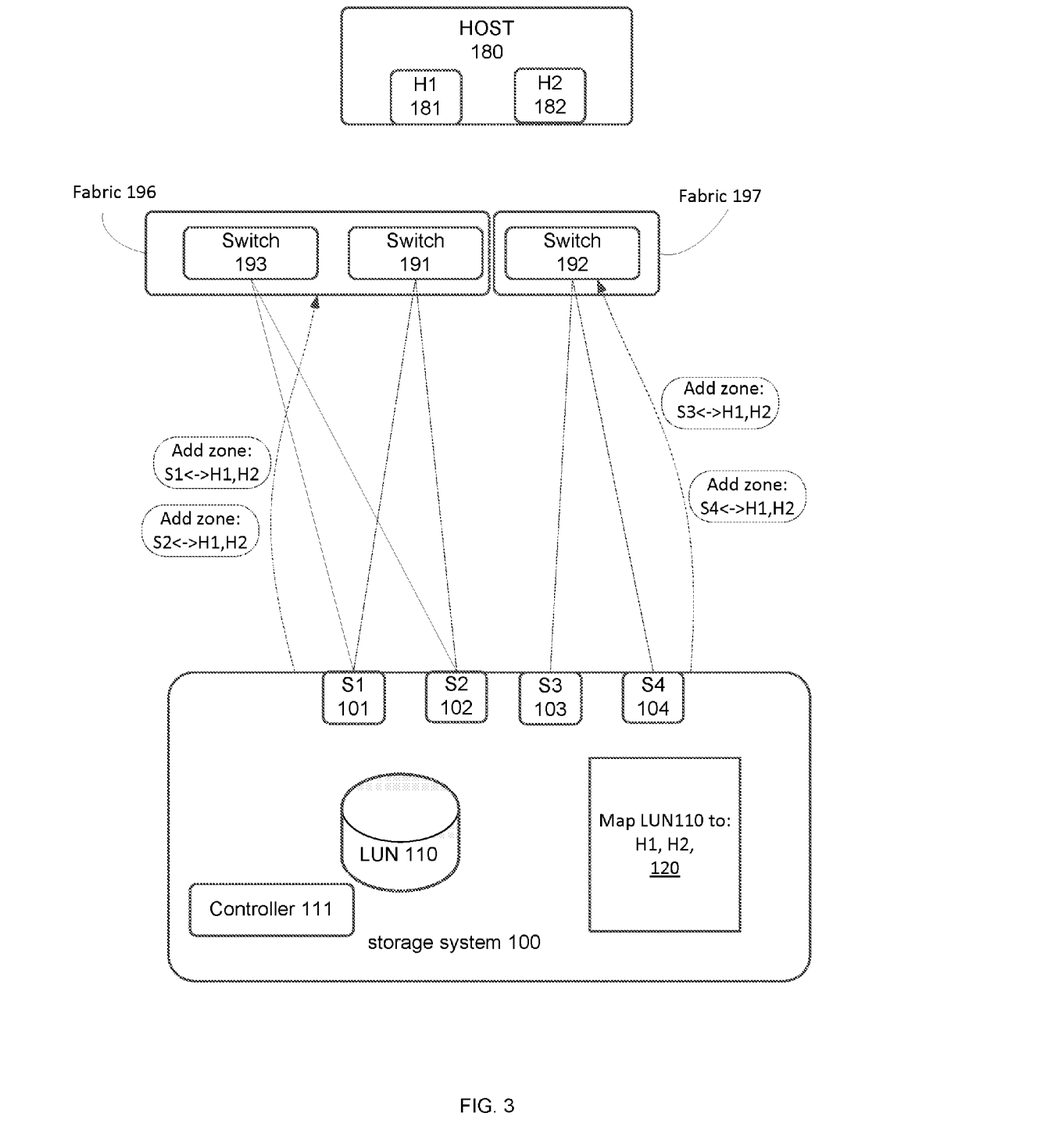
FIG. 3 illustrates a storage system, a host computer and two switching fabrics according to an embodiment of the invention.

FIG. 3 illustrates switching fabric 196 as including switches 191 and 193 instead of only a single switch. Switches 191 and 193 may be linked to each other. One switch may operate as a back-up of the other switch. The switches 191 and 193 may be synchronized to each other. For example, a FIG. 1 illustrates a host 180 that includes host ports H1 181 and H2 182. Storage system 100 manages multiple volumes, such as LUN 110, and for each volume, a LUN mapping should be configured (by e.g., a storage administrator). For example, LUN mapping 120 associates LUN 110 with host ports H1 and H2. The notations S1-S4 of the storage ports and H1-H2 of the host ports represent a WWPN for each of these ports. In this example, the storage ports are not specified in the LUN mapping, because most storage systems allow all storage ports to be connected to all LUNs, but this is not necessarily so, and the LUN mapping may further includes relevant storage ports, i.e., storage ports through which the LUN can access.

Once the LUN mapping is defined, the storage system (and especially controller 111 of storage system) can use the defined host ports for broadcasting or sending to all the switches add-zone messages. In this example, four add-zones messages are sent, one for each storage port: a first add-zone message for associating storage port S1 with all configured host ports, i.e., H1 and H2 is sent towards switch 191, a second add-zone message for associating storage port S2 with host ports H1 and H2 is sent towards switch 191, a third add-zone message for associating storage port S3 with host ports H1 and H2 is sent towards switch 192, and a forth add-zone message for associating storage port S4 with host ports H1 and H2 is sent towards switch 192. Though in this example an add-zone message is sent per storage port, other variation of messages can be sent, for example, an add-zone message per each pair of host port and storage port, which requires sending eight messages in the aforementioned example (a first message for H1-S1, a second message for H1-S2, etc.). The add-zone message can conform to the Peer Zoning (TDZ) protocol.

FIG. 1 illustrates the host as not being connected to the switches, even though the configuration of the LUNs to host ports is already set. This is a common scenario where the storage system is configured with planned host ports independently from the host setup and even before the hosts are connected. Therefore, since it is not known which host ports will be connected to switch 191 and which will be connected to switch 192, both switches are provided with the zoning of all host ports. Although FIG. 1 illustrates only one host, generally more than one host is connected, and the number of host ports exceeds two.

Subsequent to the zone definition (may take up to several days, a week, or more), the storage system receives notifications with regard to host ports that have been logged into the switch and host ports that have been logged out after being logged in. The notifications may be Fibre-Channel RSCN (Registered State Change Notification) messages, which are reported by the switch when host ports log in and log out, but the login/logout notifications may also be reported by the hosts.

According to an embodiment of the invention:
a. The storage system is configured to receive storage system configuration information that is indicative of access permissions of multiple host computer ports to storage logical units that are associated with a certain set of storage system ports. The storage system configuration information may be received, for example, from a man machine interface (not shown) that is accessible to a storage system administrator. For example, the storage system configuration information may be provided by using a system management software (such as an application) that can be accessed by the storage system administrator.
b. Controller 111 is configured to generate, in response to the storage system configuration information, access permission requests for allowing the multiple host computer ports to access the certain set of storage system ports.
c. Interface 112 is configured to send the access permission requests to at least a first switch of a group of switches that is coupled to the storage system.
d. Controller 111 is configured to determine to revoke an access permission from a certain host computer port of the multiple host computer hosts, when the certain host computer port failed to follow a predefined login pattern.
e. Interface 112 is configured to send to at least a second switch of the group of switches, a request to revoke the access permission of the certain host computer port.

The storage system 100 may be a mass storage system capable of storing at least one petabyte of information. It may include permanent storage units such as but not limited to disk drives and may support multiple logical access units. While FIG. 1 illustrates a single LUN, FIG. 4 illustrates multiple LUNs.

Figure 2:
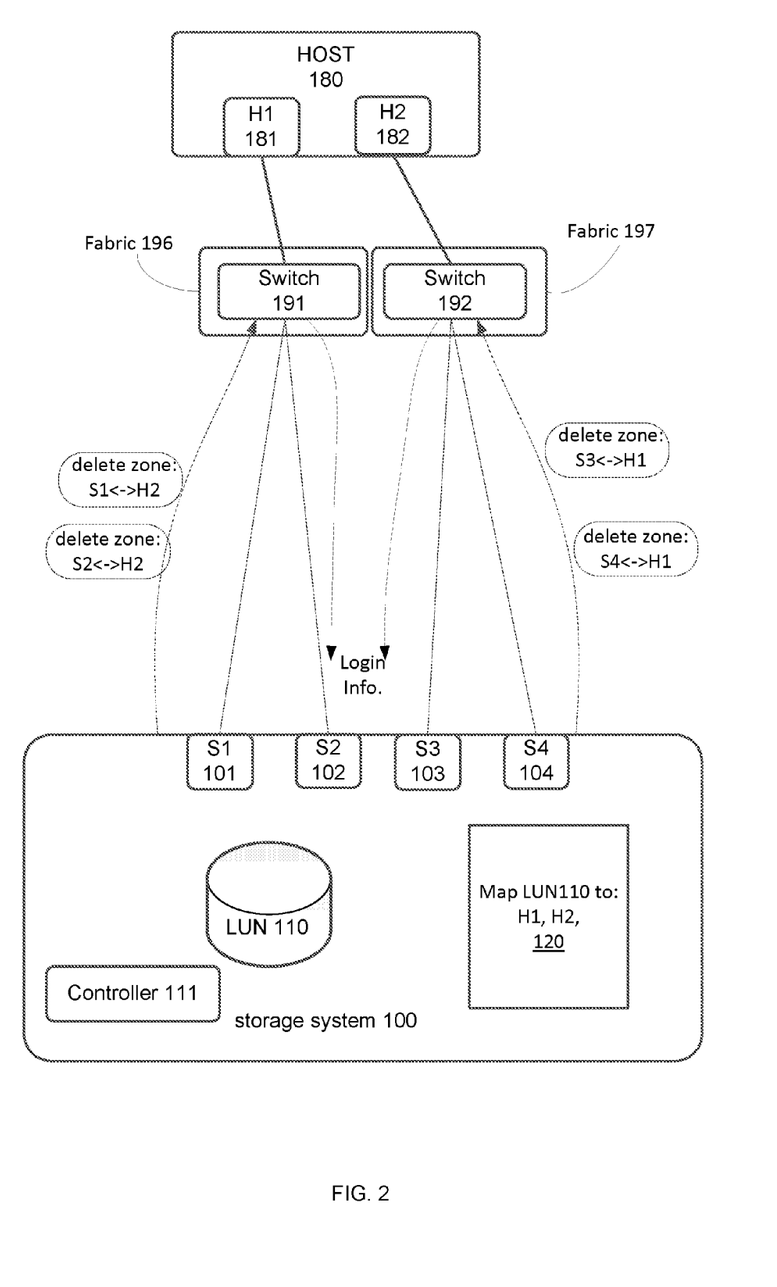
FIG. 2 illustrates a storage system, a host computer and two switching fabrics according to an embodiment of the invention.

FIG. 2 illustrates the host after being connected to the SAN, where host port H1 181 is connected to switch 191 and host port H2 182 is connected to switch 192. In this scenario, storage system 100 will receive from switch 191 a login notification from host port 181 and will also receive from switch 192 a login notification from host port 182. No login notification will be received from switch 191 with regard to host port H2 182, nor from switch 192 with regard to host port H1 181. The non-received notifications will be detected as non-notified logins upon time expiration in certain conditions.

It is noted that the storage system 100 may send the access permission requests to a first sub-group of switches and send the requests to revoke the access permission to all members of the first sub-group of switches or only to part of the first sub-group of switches. The recipients of the requests to revoke the access permission may define a second sub-group of switches. For example—zone-add messages for adding port H1 181 may be sent to both switches 191 and 192 while a delete-zone message may be sent only to switch 192.

Figure 4:
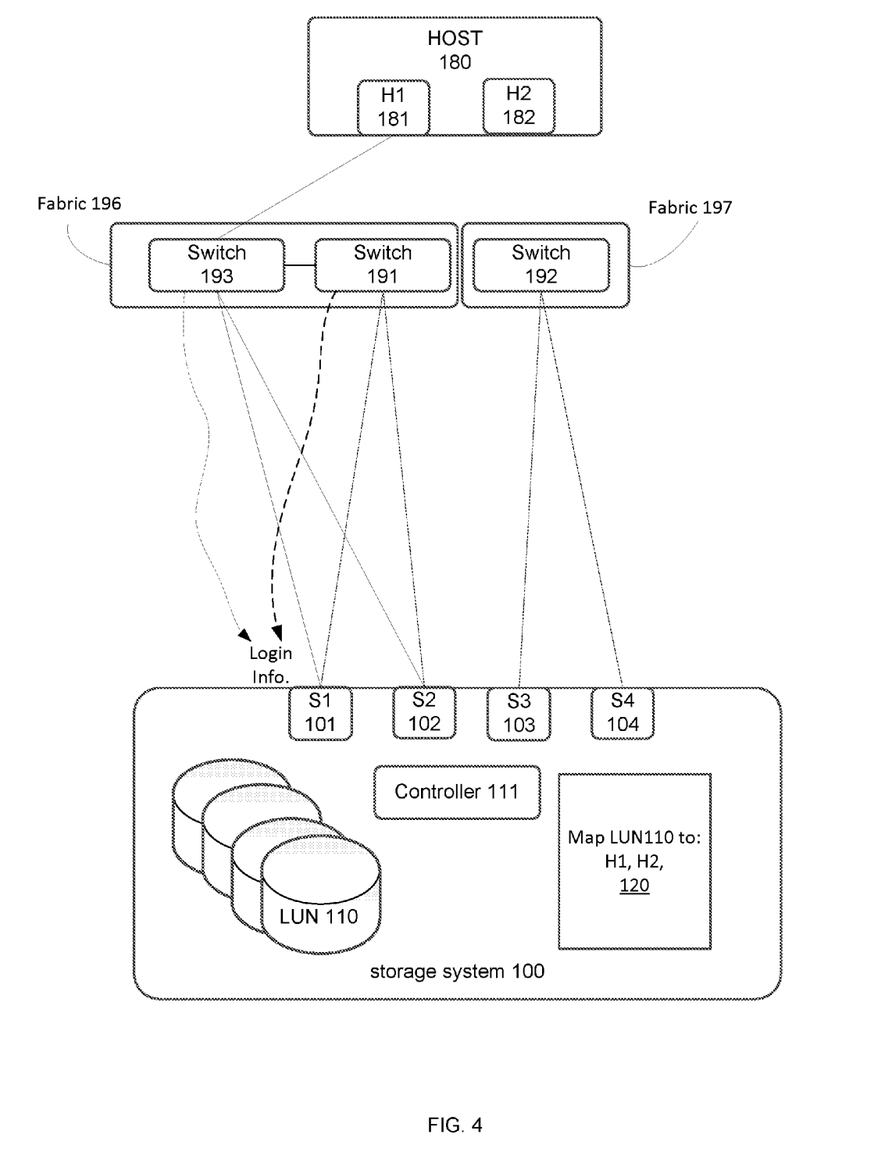
FIG. 4 illustrates a storage system, a host computer and two switching fabrics according to an embodiment of the invention.

FIG. 4 illustrates switching fabric 196 as including switches 191 and 193 instead of only a single switch.

It is noted that if a fabric includes more than one switch, then even if only one of the switches is connected to a certain host port and report a login for that port, the non-connected switch in the same fabric will probably also report a login of the certain host port, because the non-connected switch is synchronized with the connected switch with regard to connected entities.

FIG. 4 also shows that although host port H1 181 is connected to switch 193—both switches 191 and 193 send login information reflecting the login of host port H1 181 to switch 193.

The storage system 100 (and especially controller 111) is configured to determine non-notified logins of host ports that have not logged in through one or more switches.

A non-notified login corresponds to a certain host port and certain switch and can be declared when, for example, the certain host port did not log into the certain switch within a predetermined time, e.g., a week, several day or several hours. A non-notified login can also be detected if a logout notification has been received and no subsequent login has been notified within more than the predetermined time.

For each non-notified login, the storage system sends a remove-zone message to the certain switch (the switch which did not report login for the certain host port), wherein the remove-zone message identifies the certain host port to be removed from the zone. In the aforementioned example, all zones associated with host port H2 should be removed from the zone configuration of switch 191 and all zones associated with host port H1 should be removed from the zone configuration of switch 192. Therefore, two messages for deleting zones are sent to switch 191, as illustrated in FIG. 2: one for deleting the zone that associates H2 with S1 and one for deleting the zone that associates H2 with S2. Two more messages for deleting zones are sent to switch 192: one for deleting the zone that associates H1 with S3 and one for deleting the zone that associates H1 with S4. The remove-zone message can conform to the Peer Zoning (TDZ) protocol.

Figure 5:
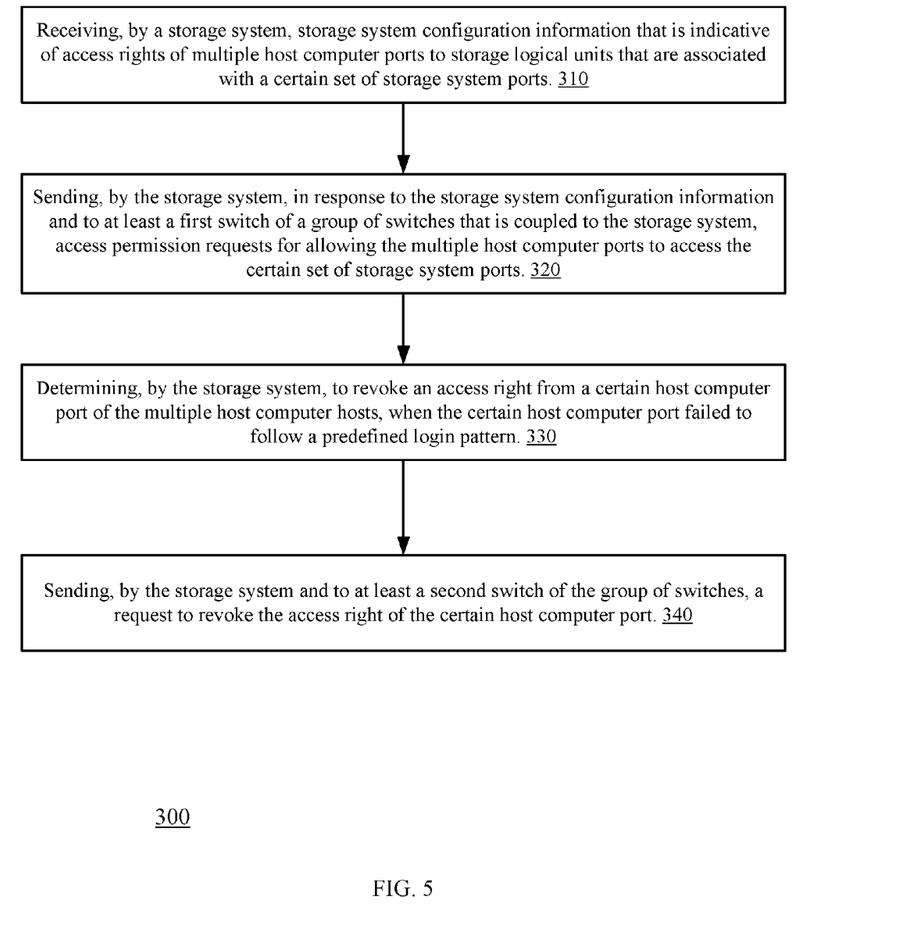
FIG. 5 illustrates a method according to an embodiment of the invention.

FIG. 5 illustrates method 300 according to an embodiment of the invention.

Method 300 may start by stage 310 of receiving, by a storage system, storage system configuration information that is indicative of access permissions of multiple host computer ports to storage logical units that are associated with a certain set of storage system ports.

A non-limiting example of storage system configuration information is a LUN mapping.

Stage 310 may be followed by stage 320 of sending, by the storage system, in response to the storage system configuration information and to at least a first switch of a group of switches that is coupled to the storage system, access permission requests for allowing the multiple host computer ports to access the certain set of storage system ports.

The access permission requests reflect the storage system configuration information.

The access permission requests may be add-zone requests.

Stage 320 may include:
i. Sending access permission requests to all switches coupled to the storage system.
ii. Sending the access permission requests only to some of switches that are coupled to the storage system.
iii. Sending access permission requests to all switching fabrics coupled to the storage system. Such a sending may include, for example, sending access permission requests to one switch in each switching fabric.
iv. Sending the access permission requests only to some of switching fabrics that are coupled to the storage system.

The storage system may be aware, at the time of the sending of the access permission requests, of which host computer ports are connected (or planned to be connected) to each switching fabric and the sending of the access permission requests information may be responsive to that knowledge. For example—the storage system may send an access permission request related to a certain host computer port to all switched fabrics that are connected to that certain host computer port. As for another example, the storage system may be aware of which switches are included in which switched fabric, so the storage system may send an access permission request related to a certain host computer port only to one switch in each switching fabric (as the switches within the fabric may exchange access information among them).

Alternatively, the storage system may not be aware, at the time of the sending of the access permission requests, of which host computer ports are connected to each switch or which switch is included in each switched fabric, so the access permission requests are sent to all switches. For example, in FIG. 1, the host computer ports are not connected to any switch and all the access permission requests are sent to switches 191 and 192 of switching fabrics 196 and 197.

Stage 320 may be followed by stage 330 of determining, by the storage system, to revoke an access permission from a certain host computer port of the multiple host computer hosts, when the certain host computer port failed to follow a predefined login pattern.

The determining may be responsive to login information indicative of a login status of the certain host computer port. The login information is generated by one or more switches of the group of switches. Usually login information is generated by a switch that the host computer port logged to and/or by all (or some of) the switches of the switching fabric to which the host computer logged to.

The predefined login pattern may be responsive to one or more login operations, one or more logoff operations, an absence of one or more login operations, an absence of one or more logoff operations, and timing of logoff and login operations.

Examples of a host computer port that follows a predefined login pattern are listed below:
a. Being logged to one or more switch of the group of switches during an entire predefined time period and/or during at least a predefined portion of the predefined time period.
b. Being logged to a certain switch of the group of switches (the certain switch is associated with the host computer port according to the zoning) during the entire predefined time period and/or during at least a predefined portion of the predefined time period.
c. Performing a certain amount of login and logoff operations during the entire predefined time period and/or during at least a predefined portion of the predefined time period.
d. Attempting to access only one or more switches that are associated with the host computer port according to the zoning during the entire predefined time period and/or during at least a predefined portion of the predefined time period.

The predefined time period may start with the reception of the storage system configuration information.

The predefined time period may be defined per host computer port and may start with the reception of storage system configuration information that lists that host computer port.

The predefined time period may be defined per host computer port and may start the host computer port logged off.

Different host computers may be associated with different (or the same) predefined time periods.

Different host computer ports may be associated with different (or the same) predefined time periods.

The predefined time period may change over time or maintain constant.

Referring to the example of FIG. 2—host port H2 182 failed to login to switch 191 during a predefined period and host port H1 181 failed to login to switch 192. These are failures to comply with a predefined login pattern. Storage system 100 determines to revoke the access permission of host port H2 182 to any of the storage system ports (ports S1 and S2) associated with switch 191 and determines to revoke the access permission of host port H1 181 to any of the storage system ports (ports S3 and S4) associated with switch 192.

Stage 330 may be followed by stage 340 of sending, by the storage system and to at least a second switch of the group of switches, a request to revoke the access permission of the certain host computer port.

Each request to revoke the access permission may be a remove-zone message that includes the certain host computer port and one or more storage ports that couples the storage system to the second switch.

The requests to revoke the access permission of the certain host computer may be sent to all switches that are coupled to the storage system, to all switching fabrics that are coupled to the storage system or at least to all switches that are connected or are expected to be connected to the certain host computer port.

Referring to the example of FIG. 2:
a. A request to revoke the access permission of host port H2 182 to any of the storage system ports (ports S1 and S2) associated with switch 191—may be sent to at least switch 191. In this case the second switch is switch 191.

Alternatively—the request to revoke the access permission of host port H2 182 may be sent to any switch of switching switching fabric 196.

b. A request to revoke the access permission of host port H1 181 to any of the storage system ports (ports S3 and S4) associated with switch 192—may be sent to at least switch 192 and/or switching switching fabric 197.

It is noted that any one of the first and second address translations may use the hash mechanism illustrated in the specification. It is further noted that a storage system may perform one, three or more different address translations. For example, there may be more than two levels of virtual address spaces, a single level of virtual address spaces, more than a single level of physical address spaces and the like.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, state bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method, comprising:
   receiving, by a storage system, storage system configuration information that is indicative of access permissions of multiple host computer ports to storage logical units that are associated with a certain set of storage system ports;
   requesting, by the storage system, in response to the storage system configuration information from at least a first switch of a group of switches that is coupled to the storage system, to add access permissions for allowing the multiple host computer ports to access the certain set of storage system ports via at least the first switch;
   determining, by the storage system, to revoke an access permission from a certain host computer port of the multiple host computer hosts, if the certain host computer port was not logged to a second switch of the group of switches during a certain time period; wherein the access permission is one of the access permissions requested to be added; and
   sending, by the storage system and to at least the second switch, a request to revoke the access permission of the certain host computer port via at least the second switch.

2. The method according to claim 1 wherein the determining is responsive to login information indicative of a login status of the certain host computer port; wherein the login information is generated by one or more switches of the group of switches.

3. The method according to claim 1 wherein the at least first switch forms a first sub-group of switches, wherein the at least second switch forms a second sub-group of switches; wherein the first sub-group of switches comprises the second sub-group of switches.

4. The method according to claim 1 wherein the first switch differs from the second switch.

5. The method according to claim 1 wherein the first switch is the second switch.

6. The method according to claim 1 wherein the at least first switch forms the group of switches.

7. The method according to claim 1 wherein the group of switches belongs to one or more switching fabrics, wherein the determining to revoke the access permission is when the certain host computer port was not logged to a certain switching fabric during a certain period.

8. The method according to claim 7 wherein the certain switching fabric comprises the at least second switch.

9. The method according to claim 1 wherein the access permission requests are add-zone messages.

10. The method according to claim 1 wherein the request to revoke the access permission is a remove-zone message.

11. A non-transitory computer readable medium that stores instructions that once executed by a storage system causes the storage system to execute the stages of:
    receiving storage system configuration information that is indicative of access permissions of multiple host computer ports to storage logical units that are associated with a certain set of storage system ports;
    requesting in response to the storage system configuration information from at least a first switch of a group of switches that is coupled to the storage system and, to add access permissions for allowing the multiple host computer ports to access the certain set of storage system ports via at least the first switch;
    determining to revoke an access permission from a certain host computer port of the multiple host computer hosts, if the certain host computer port was not logged to a second switch of the group of switches during a certain time period; wherein the access permission is one of the access permissions requested to be added; and sending to at least the second switch, a request to revoke the access permission of the certain host computer port via at least the second switch.

12. The non-transitory computer readable medium according to claim 11 wherein the group of switches belongs to one or more switching fabrics, wherein the determining to revoke the access permission is when the certain host computer port was not logged to a certain switching fabric during a certain period.

13. A storage system that comprises a controller and an interface;

wherein the storage system is configured to receive storage system configuration information that is indicative of access permissions of multiple host computer ports to storage logical units that are associated with a certain set of storage system ports;

wherein the controller is configured to generate, in response to the storage system configuration information, access permission requests for allowing the multiple host computer ports to access the certain set of storage system ports via at least the first switch;

wherein the interface is configured to send the access permission requests to at least a first switch of a group of switches that is coupled to the storage system;

wherein the controller is configured to determine to revoke an access permission from a certain host computer port of the multiple host computer hosts, if the certain host computer port was not logged to a second switch of the group of switches during a certain time period; and wherein the interface is configured to send to at least the second switch of the group of switches, a request to revoke the access permission of the certain host computer port via at least the second switch.

* * * * *